Dec. 29, 1964    T. L. JOHNSTON ETAL    3,163,401
APPARATUS FOR TRANSPORTING ARTICLES
Filed July 16, 1962    3 Sheets-Sheet 1
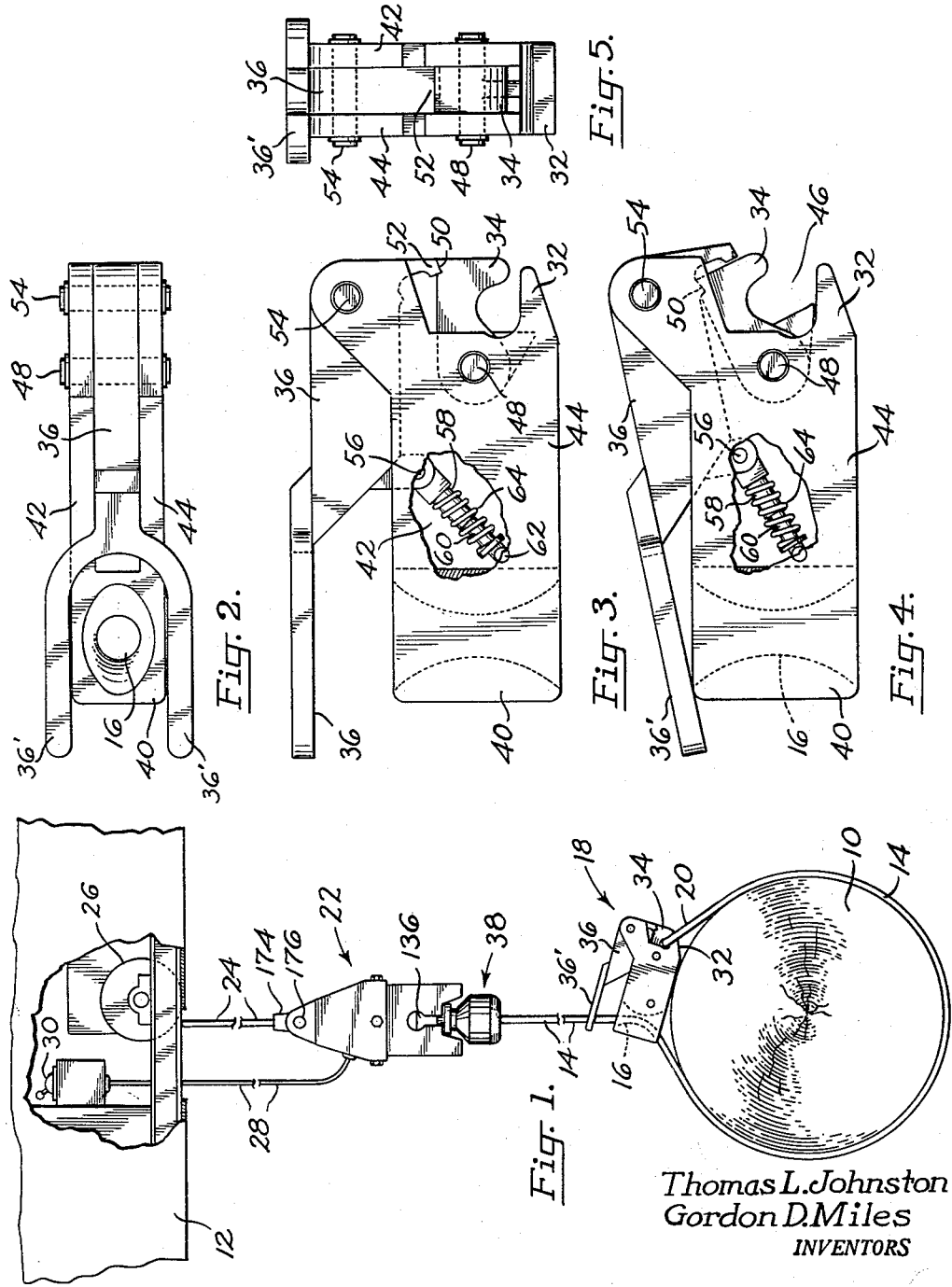
Thomas L. Johnston
Gordon D. Miles
INVENTORS
BY *Oliver D. Olson*
Agent

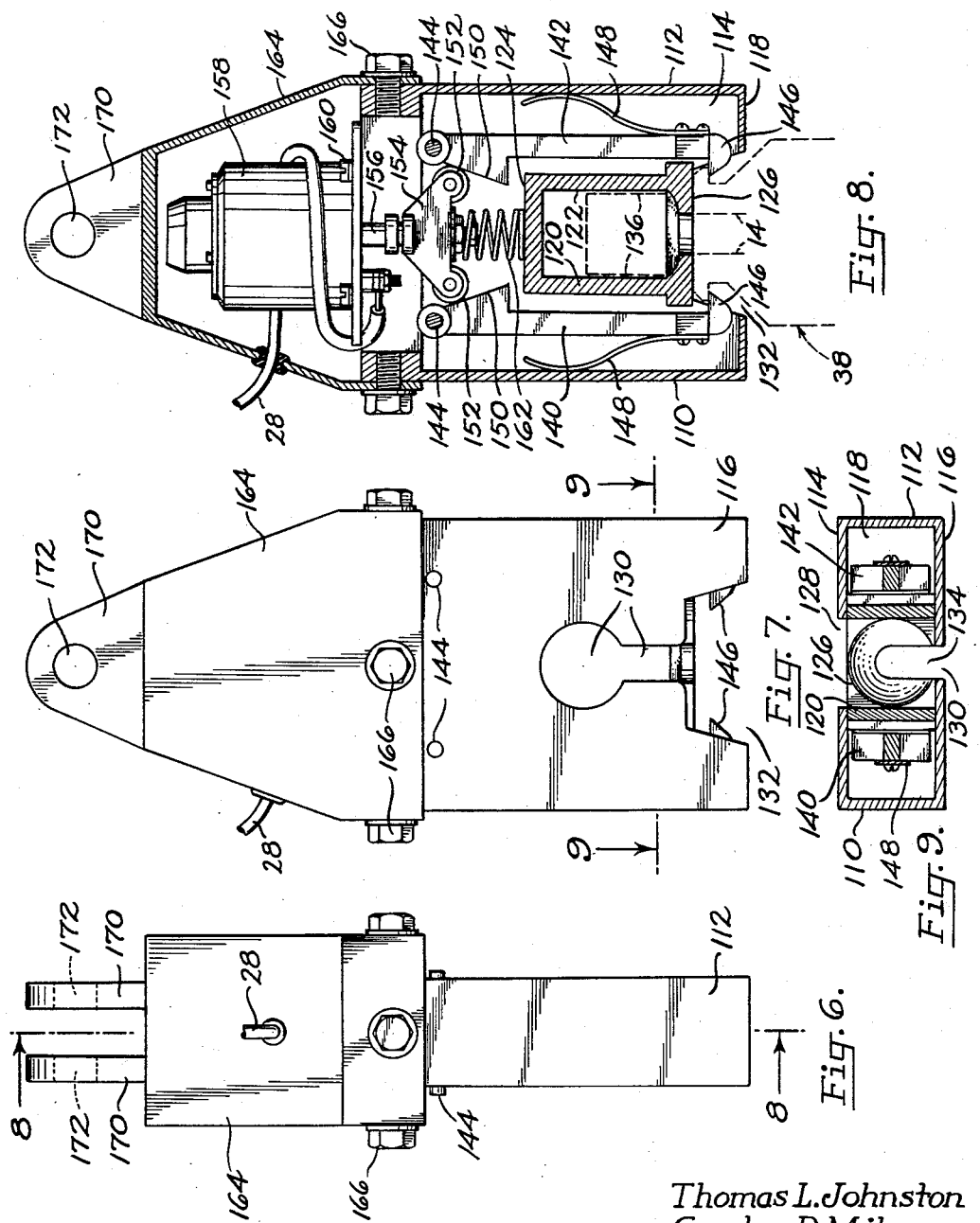

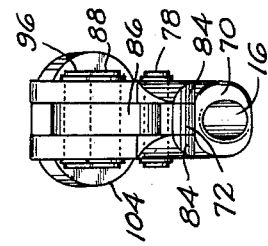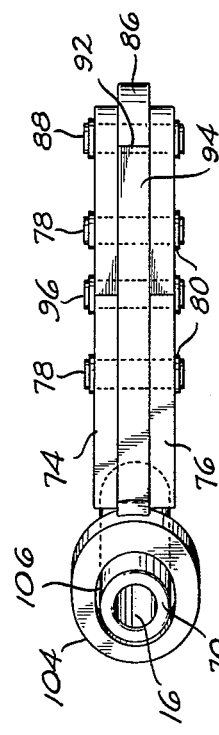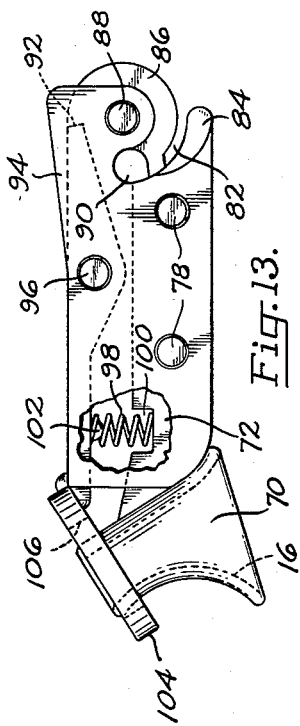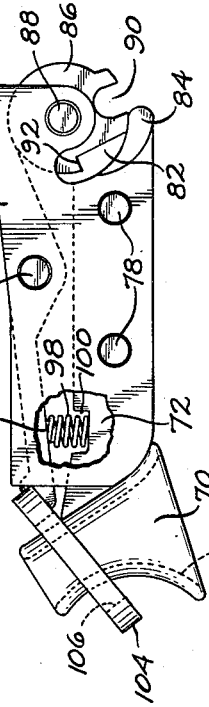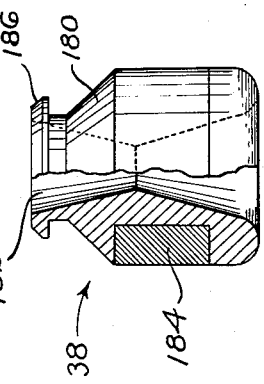
Thomas L. Johnston
Gordon D. Miles
INVENTORS

United States Patent Office 3,163,401
Patented Dec. 29, 1964

3,163,401
APPARATUS FOR TRANSPORTING ARTICLES
Thomas L. Johnston and Gordon D. Miles, Portland, Oreg., assignors to Columbia Helicopters, Inc., Portland, Oreg., a corporation of Oregon
Filed July 16, 1962, Ser. No. 209,848
7 Claims. (Cl. 258—1.2)

This invention relates to the transporting of articles such as logs, pipes, beams, etc., and more particularly to a novel method and apparatus which enables such operations to be performed by helicopter.

It is generally acknowledged, for example, that substantial stands of timber remain unused because of the difficulty and high cost of gaining access to them. For example, large stands of timber remain unused in Alaska and other areas because of the high cost of building roads over the rugged terrain and maintaining such roads through the severe weather. In other areas smaller but high grade stands of timber remain unused because of the excessive cost of access roads in relation to the amount of timber available.

Similar problems are presented to the laying of pipe lines and the erection of structures in remote areas.

Accordingly, it is a principal object of this invention to provide a method and apparatus by which to afford economical and practicable transport of articles over areas which do not permit transport by conventional methods and means.

It is another important object of the present invention to provide a method and apparatus by which the logging of otherwise economically impracticable areas is rendered feasible.

Another important object of this invention is the provision of transporting apparatus which includes a choker hook construction capable of being operated to release condition from a remote position.

The foregoing and other objects and advantages of this invention will appear from the following detailed description, taken in connection with the accompanying drawings in which:

FIG. 1 is a fragmentary foreshortened view in side elevation of transporting apparatus embodying features of the present invention and illustrating the method of the present invention;

FIG. 2 is a plan view of a choker hook embodying features of this invention;

FIG. 3 is a side elevational view, partly broken away, of the choker hook shown in FIG. 2, as viewed from the bottom of FIG. 2, the same being shown in locking position;

FIG. 4 is a side elevational view similar to FIG. 3 but showing the choker hook in release position;

FIG. 5 is an end elevation as viewed from the right in FIG. 3;

FIG. 6 is an end elevation of a choker hook release device embodying features of the present invention;

FIG. 7 is a side elevation as viewed from the right in FIG. 6;

FIG. 8 is a sectional view taken along the line 8—8 in FIG. 6;

FIG. 9 is a sectional view taken along the line 9—9 in FIG. 7;

FIG. 10 is a plan view of the weight component of the choker hook assembly;

FIG. 11 is a side elevation, partly sectioned, of the weight component shown in FIG. 10;

FIG. 12 is a plan view of a second form of choker hook embodying features of the present invention;

FIG. 13 is a side elevation, partly broken away, as viewed from the bottom in FIG. 12, the hook being shown in locking position;

FIG. 14 is a side elevation similar to FIG. 13 but showing the hook in release position; and FIG. 15 is an end elevation as viewed from the right in FIG. 13.

The method and general apparatus of the present invention is illustrated in FIG. 1 of the drawings, wherein a log 10 is shown suspended from a helicopter 12. A choker cable 14 is passed freely through an opening 16 in a choker hook 18 and is provided at one end with a loop 20 for releasably engaging the choker hook. An intermediate length of the choker cable is looped about the log and the loop releasably engaged in the choker hook. The opposite end of the choker cable is secured to a choker hook release control device 22 which is suspended from one end of a hoisting cable 24. The opposite end of the hoisting cable is secured to a power driven winch 26 mounted in the helicopter.

In the embodiment illustrated the choker hook release control device is electrically actuated, and the electrical actuator thereof is connected through the conductor cable 28 and control switch 30 to a source of electric potential within the helicopter.

The choker hook includes a pair of relatively movable jaws 32, 34 adapted to releasably confine the choker cable loop therebetween. The movable jaw 34 is releasably secured in locking position by means of a movable latch member 36, a portion 36' of which is arranged to extend in close proximity to the length of choker cable which extends between the choker hook opening 16 and the release control device.

The choker hook release control device includes a weight element 38 releasably secured to the control device and freely encircling the length of choker cable intermediate the control device and choker hook release latch. Thus, upon actuation of the control device by appropriate manipulation of the control switch by the operator in the helicopter, the weight is released from the control device and falls by gravity until it strikes the choker hook release latch. The latter thereupon rotates under the impact of the weight, thereby unlocking the choker hook and permitting the choker cable loop to pull free and discharge the log.

Referring now to FIGS. 2-5, the choker hook 18 illustrated therein includes a body having a rearward portion 40 provided with the opening 16 extending between the top and bottom edges. As indicated, this opening preferably diverges outwardly in both directions from a point intermediate its ends, and the opposite ends of the opening preferably are elliptical in shape with the longer axis extending in the direction of the longitudinal axis of the body.

The forward portion of the body is bifurcated to provide a pair of laterally spaced longitudinally extending arms 42, 44. The forward portion of these arms are cut away intermediate their top and bottom edges to provide laterally aligned openings 46. The portions of the arms underlying the openings define the fixed jaw elements 32, and these cooperate with a movable jaw element 34 positioned between the arms and mounted pivotally thereon by the pivot pin 48.

Means is provided for releasably locking the movable jaw in choker loop securing position. In the embodiment illustrated, a notch 50 is provided in the upper forward end of the movable jaw, and this notch is adapted to freely receive the locking pawl 52 projecting from the forward end of the locking latch 36. Upstanding extensions on the arms 42, 44 receive the locking latch between them for pivotal interconnection by means of the pin 54.

The rearward portion 36' of the locking latch is bifurcated to provide a pair of laterally spaced fingers which extend rearward beyond the opening 16 in the rearward body portion. Thus, referring to FIG. 1, the length of choker cable 14 extending upwardly from the choker hook opening is cause to pass freely between the fingers, whereby the latter are in position to be struck by the weight element 38 when the latter is released from the choker hook release control device 22.

Mounted pivotally on the locking latch, by means of the pin 56, is a hollow sleeve 58. The rearward end of the sleeve slidably receives the forward end of the rod 60, the rearward end of which is mounted pivotally on the choker hook body by means of the transverse pin 62. The sleeve and rod serve to guide the encircling spring 64 which bears at its rearward against the pin 62, and hence against the body 40, and at its forward end against a shoulder on sleeve 58, and hence against the locking latch. The arrangement of the pins 56, 62 is such that, as the locking latch is pivoted counterclockwise from the locking position shown in FIG. 3 to the release position shown in FIG. 4, the pin 56 traverses the line drawn between the centers of the pins 62 and 54. Accordingly, in the position illustrated in FIG. 3, the spring maintains the locking latch resiliently in the locking position, and in the position illustrated in FIG. 4 the spring maintains the locking latch resiliently in the release position.

Referring now to the embodiment illustrated in FIGS. 12–15, the choker hook includes a body having a rearward end portion 70 provided with the opening 16 extending between the top and bottom edges, as in the embodiment illustrated in FIGS. 2–5. The forward body portion 72 serves as a support for the pair of laterally spaced arms 74, 76 which are secured thereto by means of the pins 78 and associated keeper rings 80. The arms are provided with laterally aligned arcuate slots 82 which extend from the forward ends of the arms adjacent the bottom edges of the latter, arcuately upward and rearward. The lower forward portions of the arms thus define fixed jaws 84, and these cooperate with a rotatable jaw element 86 which is interposed between the spaced arms and mounted on the pivot pin 88 extending between the arms. The rotatable jaw is provided with a radial notch 90 adapted to receive the choker cable loop 20, and is also provided with a radial projection 92 adapted for cooperation with the locking latch 94. This latch is positioned between the spaced arms and mounted pivotally thereon, intermediate its ends, by means of the pivot pin 96. The forward end of the latch is adapted to releasably engage behind the projection 92, when the movable jaw is rotated to the position shown in FIG. 13, and the latch is retained resiliently in this position by means of the compression spring 98 interposed between the body portion 72 and latch rearward of the pivot pin 96. The spring is retained in position by confinement at its lower end in the socket 100 provided in the body and at its upper end by encircling the stud 102 projecting from the underside of the latch.

The rearward end of the latch supports an annular ring 104, the opening 106 in which is proportioned to receive the upper end of the rearward portion 70 of the body. Accordingly, the ring also encircles the choker cable 14 which extends through the body opening 16, and hence is in position to be struck by the descending weight element 38 when the latter is released from the choker hook release control device 22.

Referring now to FIGS. 6–11, the choker hook release control device 22 includes a bottom housing section having side walls 110 and 112, rear walls 114, front wall 116 and bottom wall 118. Mounted within the bottom housing section and secured to the front and rear walls of the latter is a cable anchor socket member having end walls 120 and 122, top wall 124 and bottom wall 126. The front and back edges of the socket walls are secured to the front and back walls of the bottom housing section, as by means of welding, with the bottom and end walls of the socket member spaced inwardly from the corresponding walls of the bottom housing section. An opening 128 in the rear wall of the bottom housing section registers with the open rear side of the socket, and a key hole slot 130 in the front wall of the bottom housing section registers with the open front end of the socket. The bottom wall, rear wall and front wall of the bottom housing section are cut away to provide a central opening 132 exposing the inwardly spaced bottom wall 126 of the socket.

The bottom constricted end of the key hole slot 130 registers with a slot 134 provided in the bottom wall of the socket, the latter slot extending from the front edge to a point slightly rearward of the center of the bottom wall.

By means of the foregoing arrangement an enlarged anchor member 136 secured to the terminal end of the choker cable 14 may be seated in the socket to releasably secure the choker cable thereto. This connection is made by extending the anchor member rearwardly through the enlarged portion of the key hole slot 130 and sufficiently through the rear opening 128 of the socket to permit the anchor member to clear the key hole slot. The attached cable then may be swung downward through the constricted portion of the key hole slot and into the slot 134 in the bottom wall of the socket, whereby to seat the anchor member therein.

A pair of opposed jaw arms 140 and 142 are mounted pivotally at their upper ends within the bottom housing section, by means of the pivot pins 144 supported between the front and rear walls of the bottom housing section. The jaw arms extend downward along opposite end walls of the socket member, and are provided at their lower ends with inwardly projecting jaw elements 146 which are positioned intermediate the respective bottom walls 126 and 118 of the socket and bottom housing section.

The pivoted jaw arms are biased resiliently inward, as by means of the springs 148 which are secured at one end to each arm and are bent at their opposite ends to resiliently engage the end walls of the bottom housing section. In this normal position of the arms the jaw elements 146 project inwardly into the central opening 132, for purposes described more fully hereinafter.

Adjacent the upper ends of the jaw arms the latter are provided with oblique cam segments 150, the cam surfaces of which converge in the direction downward from the pivot pins 144. Engaging these opposed cam surfaces are a pair of rollers 152 mounted at opposite ends of a laterally extending roller support 154. The roller support is secured to the lower projecting end of the armature rod 156 of an electric solenoid 158 which is mounted upon the upper end of the bottom housing section, as by means of the screws 160. The solenoid is arranged to project the armature rod downward when actuated, and the armature rod is retracted upwardly by means of the coil spring 162 which is interposed between the roller support 154 and the top wall 124 of the socket member.

The solenoid and the upper end of the lower housing section are enclosed by the upper housing section 164 which is releasably secured to the lower section by such means as the screws 166. The electrical conductor cable 28 for the solenoid extends outwardly through an insulated opening in the top housing section.

Extending upwardly from the top housing section are a pair of spaced flanges 170 provided with axially aligned openings 172. The lower end of the hoisting cable 24 is attached to a connector 174 (FIG. 1) adapted to be received freely between the spaced flanges and provided with an opening adapted to register with the aligned openings in the flanges for pivotal interconnection by a pin 176.

Referring now to FIGS. 10 and 11, the weight element 38 illustrated therein includes a steel body 180 having an axial bore 182, therethrough which preferably diverges outward in both directions from a point intermediate the ends thereof. An annular groove in the periphery of the body supports an annular ring 184 of lead or other suitable heavy material by which to give the weight element the degree of weight necessary for it to perform its function, as described hereinbefore. The upper end of the weight element is provided with a radially projecting flange 186. The diameter of this flange is dimensioned slightly larger than the distance between the jaw elements 146 when the latter are in their normal inward positions, and slightly smaller than the distance between the jaw elements when the latter are retracted outward, as described more fully hereinafter.

The operation of the apparatus now will be described in connection with FIGS. 1–11. Assuming the logging operation is to be conducted by helicopter, the pilot hovers over the log 10 to be transported, and operates the hoisting cable winch 26 to extend the choker cable 14 downward to a position at which it may be looped about the log. Ground personnel thereupon loops the choker cable around the log and, with the choker hook 18 opened to the position illustrated in FIG. 4, inserts the choker cable loop 20. The movable jaw 34 then is drawn downward to confine the loop, and the latch 36 is rotated clockwise to the jaw locking position shown in FIG. 3. The weight element 38 is slid upwardly along the choker cable and its upper annular flange 186 is snapped over the opposed jaw elements 146 (FIG. 8), the springs 148 accommodating resilient retraction of the jaw arms 140, 142 for this purpose. The assembly now is in the condition illustrated in FIG. 1.

The helicopter pilot then may operate the winch to reel in the hoisting cable and elevate the log above the ground. Alternatively, he may simply fly the helicopter upward without first reeling in the hoisting cable. In either event the helicopter is flown to the river or other suitable terminus where the log is to be deposited. The latter is achieved by the pilot's operation of the control switch 30 to energize the solenoid 158 in the control device 22. Upon such activation the solenoid armature 156 is extended downward, causing the cam rollers 152 to move downward along the cam surfaces 150 of the jaw arms. The latter thus are pivoted away from each other, effecting release of the jaw elements 146 from the annular flange 186 of the weight element 38. The latter thereupon falls by gravity, being guided by the cable 14. The weight ultimately strikes the fingers 36' of the locking latching with a force sufficient to rotate the latter about its pivot pin 54, counterclockwise to the position illustrated in FIG. 4. The locking pawl 52, having released the movable jaw 34, the force exerted on the choker cable 14 by the log causes the movable jaw to be rotated counterclockwise by the cable loop 20, thus permitting the latter to pull free and release the log.

The helicopter then returns to the loading site for another log.

In the use of the choker hook illustrated in FIGS. 12–15, the movable jaw 86 is adjusted to the position illustrated in FIG. 14 and the choker cable loop 20 inserted in the notch 90. As the movable jaw is rotated clockwise, by appropriate force applied to the choker cable loop, the latter is drawn into the arcuate slot 82 to the position illustrated in FIG. 13. In this position the projection 92 on the movable jaw is rotated forwardly of the forward end of the locking latch 94, whereupon the latter rotates clockwise, automatically under the force exerted by the spring 98, to lock the movable jaw against counterclockwise rotation. At the unloading site the weight element 38 is released, and it strikes the ring 104 with sufficient force to rotate the locking latch 94 counterclockwise, against the tension of the spring 98, to retract the forward end of the latch from the projection 92. The pull exerted against the choker cable loop by the weight of the log thereupon rotates the movable jaw 86 counterclockwise to the position illustrated in FIG. 14, whereupon the choker cable is released from the log.

Although the method and apparatus of the present invention has been described hereinbefore in connection with a helicopter, it will be apparent that the apparatus may be employed to substantial advantage in conventional ground logging operations. For example, the solenoid control switch 30 may be located in the cab of a hoisting crane or at a high line operator's station for use by the operator in releasing a log from the choker, cable, from the safety of his remote position. In place of the choker release mechanism 22, 38 an electrically actuated solenoid may be mounted on the choker hook to interconnect the body and latch for releasing the latter by operating the switch 30 in the circuit of said solenoid. Additionally, the method and apparatus of this invention may be employed in the transport, by helicopter, crane, etc., of such other articles as pipes, beams and diverse other structures capable of being supported by a choker cable. The foregoing and other modifications and changes may be made without departing from the spirit of this invention and the scope of the appended claims.

From the foregoing it will be apparent that the present invention makes possible the economic transport of articles over difficultly accessible areas, and particularly affords the logging of timber from areas heretofore bypassed, thereby adding materially to the quantity and quality of timber available for processing. The apparatus provided for this purpose is of rugged and simplified construction for economical manufacture and maintenance.

Having now described our invention and the manner in which it may be used, what we claim as new and desire to secure by Letters Patent is:

1. Article transporting apparatus comprising, in combination with a movable support, a choker cable having a loop at one end and adapted to be suspended at its opposite end downwardly from the movable support, a choker hook having relatively movable locking jaws for releasably securing the choker cable loop therebetween, the choker hook also having a cable guide opening freely receiving an intermediate portion of the suspended choker cable vertically therethrough, movable latch means on the choker hook operatively associated with a movable one of the locking jaws for releasably securing the latter in locking position, the latch means having a weight striker portion disposed above and adjacent the choker cable opening in the choker hook, a latch actuating weight member mounted slidably on the choker cable for engagement with the striker portion of the latch means, a weight release device suspended from the movable support and attached to the end of the choker cable opposite the loop and including holding means releasably securing the weight member thereto a spaced distance above the striker portion of the latch means, and control means for the holding means and operable to release the weight member from the holding means, the control means being positioned remotely from the choker hook.

2. The apparatus of claim 1 wherein the movable support is a helicopter, and the control means is located in the helicopter.

3. The apparatus of claim 1 wherein the weight release device comprises opposed jaws mounted for movement between weight securing and weight releasing positions, drive means engaging the jaws for moving the latter to weight release position, and electric actuator means for the drive means having an electric circuit, and the control means comprises a switch in the electric circuit of the actuator means.

4. The apparatus of claim 1 wherein the choker hook comprises a body having said cable guide opening therethrough adjacent one end for freely receiving the choker cable, a fixed jaw on the opposite end of the body, a movable jaw mounted on the body for movement relative to the fixed jaw between cable locking and cable releasing positions, and a latch member mounted on the body for pivotal movement on an axis substantially normal to the axis of the guide opening for movement between a locking position in which it engages the movable jaw when the latter is in locking position and a releasing position in which it is disengaged from the movable jaw.

5. A choker hook comprising a body having top and bottom sides and a vertically extending cable guide opening therethrough for freely receiving a vertically suspended choker cable, a fixed jaw on the body, a movable jaw mounted on the body for movement relative to the fixed jaw between cable locking and cable releasing positions, and a latch member mounted on the body for pivotal movement on an axis substantially normal to the axis of the guide opening for movement between a locking position in which it engages the movable jaw when the latter is in locking position and a releasing position in which it is disengaged from the movable jaw, the latch member including a weight striker portion disposed above and adjacent the guide opening for engagement by an actuator weight supported slidably on the choker cable.

6. The choker hook of claim 5 wherein the movable jaw is mounted pivotally for movement toward and away from the fixed jaw, and the latch member is mounted for releasably engaging the movable jaw on the side opposite the fixed jaw.

7. The choker hook of claim 5 wherein the movable jaw is mounted for rotation and has a cable receiving slot therein, the fixed jaw has an arcuate edge closing the slot in the movable jaw, and the movable jaw has a projection arranged for engagement with the latch member when the movable jaw is in locking position.

References Cited in the file of this patent
UNITED STATES PATENTS

| | | |
|---|---|---|
| 350,223 | Von der Wulbeike | Oct. 5, 1886 |
| 502,487 | Drake | Aug. 1, 1893 |
| 603,985 | Guyer et al. | May 10, 1898 |
| 922,929 | Mallon | May 25, 1909 |
| 1,038,356 | Hamilton | Sept. 10, 1912 |
| 1,621,604 | Ruggles | Mar. 22, 1927 |
| 1,963,634 | Stahl | June 19, 1934 |
| 2,904,369 | Campbell | Sept. 15, 1959 |